Figure 1:
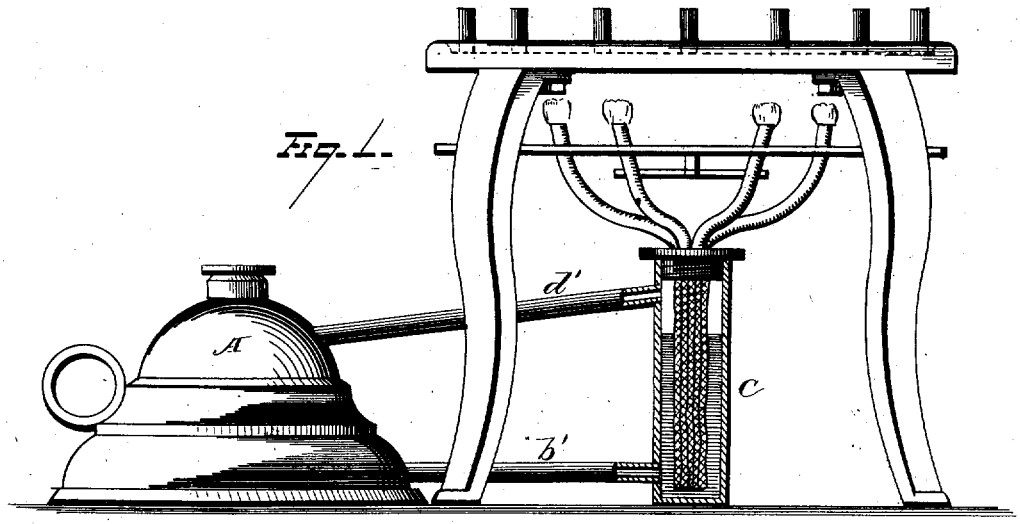

E. M. LOWDEN.

Lamp.

No. 8,729. Reissued May 27, 1879.

WITNESSES

E. F. Nottingham

A. M. Bright.

INVENTOR

E M Lowden.

By H. A. Seymour.

ATTORNEY

N. PETERS, PHOTO-LITHOGRAPHER, WASHINGTON, D. C.

UNITED STATES PATENT OFFICE.

EDWARD M. LOWDEN, OF NEW YORK, N. Y.

IMPROVEMENT IN LAMPS.

Specification forming part of Letters Patent No. 155,456, dated September 29, 1874; Reissue No. 8,729, dated May 27, 1879; application filed January 28, 1879.

*To all whom it may concern:*

Be it known that I, EDWARD M. LOWDEN, of New York, in the county of New York and State of New York, have invented a certain new and useful Improvement in Lamps, of which the following is a full, clear, and exact description, such as will enable others skilled in the art to which it pertains to make and use it, reference being had to the accompanying drawings, which form part of this specification.

My invention relates to an improvement in lamps for lighting, heating, and cooking purposes.

Heretofore many disastrous lamp-explosions have resulted by reason of the generation of explosive gases or vapors in the wick-reservoirs of lamps, no provision having been made for the escape of such explosive gases. The generation and accumulation of such explosive vapors in the wick-reservoirs of lamps has been caused by the heat of the lamp-flame being conducted by the metallic wick tube or tubes to the wick-reservoir and unduly heating the oil contained therein, and as no provision has been made for the escape of such heated gas or vapor, its gradual accumulation and expansion within the wick receptacle or reservoir often results in an explosion and attendant disastrous effects.

The object of my invention is to obviate the defects above noted, and provide lamps of such construction that the inner space of the wick-reservoir shall be at all times in direct communication with the outside air, whereby all danger of any accumulation or explosion of gas or vapor in the wick-reservoir of a lamp is prevented; and to this end my invention consists, first, in the combination, with a lamp provided with an independent oil-reservoir, of a tube connecting the oil-reservoir with the lower end of the wick receptacle or reservoir, and a vent-tube connecting with the upper portion of the wick-receptacle, and extending outwardly therefrom a sufficient distance to prevent the gas or vapor issuing therefrom from mingling directly with the flame of the lamp; second, the combination, with a lamp provided with an independent oil-reservoir, of a vent-tube secured at opposite ends to the oil-reservoir and wick-receptacle, said vent-tube being arranged and constructed to establish a communication between the outer air and interior chamber of the wick-receptacle; third, the combination, with an oil-reservoir provided with a vent-opening in the upper portion thereof, of a wick-receptacle provided with a vent-tube, the latter communicating at one end with the interior chamber of the wick-receptacle, and extending outwardly therefrom a sufficient distance to prevent the gas or vapor issuing therefrom from mingling directly with the flame of the lamp; fourth, the combination, with an oil-reservoir provided with a vent-opening in the upper portion thereof, of a vent-tube, one end of which communicates with the interior chamber of the wick-receptacle, while the outer end or portion of said vent-tube is attached to the oil-reservoir; fifth, the combination, with an oil-reservoir provided with a vent-opening in the upper portion thereof, of a vent-tube constructed and arranged to establish a communication between the upper portion of the oil-reservoir and wick-receptacle; sixth, the combination, with an oil-reservoir and wick receptacle or reservoir of a lamp, of a tube for conveying oil from the oil-reservoir to the wick reservoir or receptacle, and a vent-tube attached to the oil-reservoir and wick-receptacle, said vent-tube serving to allow of the free escape of gas or vapors from the wick reservoir or receptacle to the outer air, and also serving as a brace between the oil-reservoir and wick-receptacle.

Figure 2:
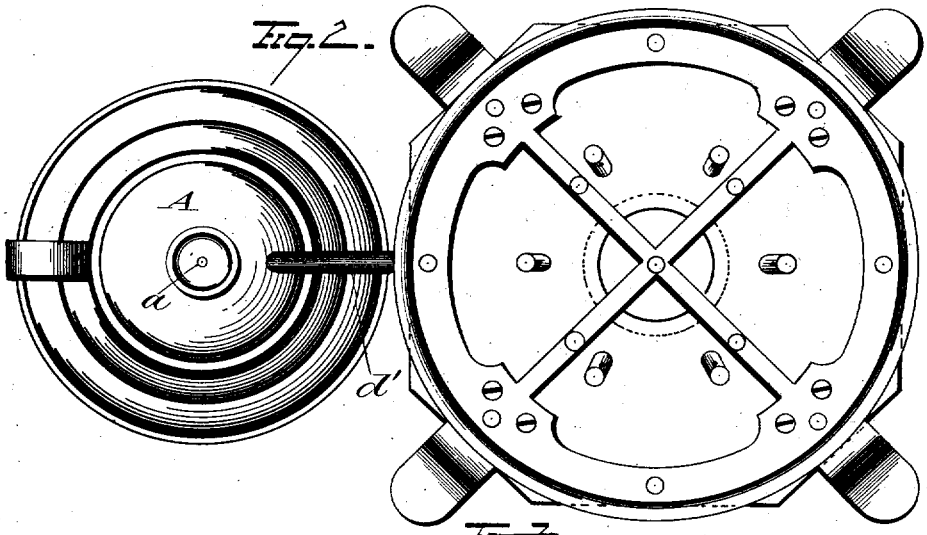
Figure 3:
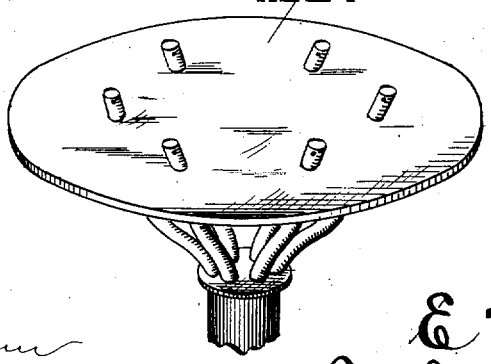

In the accompanying drawings, Figure 1 is a side elevation, partly in section, of one form of a lamp embodying my invention. Fig. 2 is a plan view of the lamp. Fig. 3 is a view in perspective of the deflector.

A is the main oil-reservoir, and C the wick reservoir or receptacle, of a lamp, the oil-supply being conducted from the oil-reservoir to the wick reservoir or tube by means of the supply-tube $b'$, located near the base of the oil-reservoir A. To the upper portion of the wick-receptacle is attached a vent-tube, $d'$, which communicates with the inner chamber of the wick-receptacle at a point above the level of the oil or other burning material.

The object and function of the vent-tube is to relieve the wick receptacle or reservoir C of any surplus vapor or gas which may be formed therein from any cause, and discharge it at a safe distance from the flame of the lamp-burner, thereby preventing the escaping vapor from mingling directly with the flame of the lamp and becoming ignited thereby.

The essential feature in the construction and arrangement of the vent-tube relative to the wick tube or receptacle is, that it shall connect with the upper portion thereof and conduct any vapor or gas generated therein away sufficiently distant from the flame of the lamp to prevent ignition and possible explosion.

As heretofore stated, one end of the vent-tube connects with the wick reservoir or tube, while the other end or portion thereof is preferably attached to the oil-reservoir. I prefer inserting the outer open end of the vent-tube *d'* into the oil-reservoir A above the level of the oil, and thereby constitute a communication with the outer air by means of the vent-hole *a* in the top of the oil-reservoir. This arrangement and construction of parts allows the vapor or gas, should any be generated in the wick-receptacle, to flow through the vent-tube into the upper portion of the oil-reservoir, and from thence to the outer air.

Instead of forming the vent *a* in the top of the oil-reservoir it may be formed in any part thereof, or in any attachment thereto that admits of a vent of air to and from the interior of said oil-reservoir above the level of the oil or burning material therein; then, by attaching a burner and wick receptacle or tube and filling the reservoir, the lamp is ready for use.

The improvement is obvious. The vent-tube *d'*, either alone or in co-operation with a vent-hole in the oil-reservoir, acts as a safety-valve, preventing an explosion either by expansion or sudden ignition of the vapors of the fluid or oil used in the lamp. It also admits the required amount of air necessary for combustion, obviating the sucking operation which takes place when air is obtained through the burner, and which any one practically acquainted may have observed with other lamps when the air in them is exhausted, and which very quickly is the case when the wick-tube vapor-burners are used, and causes the light to go out. The vent-tube *d'* also makes practicable and satisfactory the construction of the upright wick reservoir or tube C of small proportion or diameter, and allows the same to be placed at any desired distance from the oil-reservoir, therefore requiring but a small proportion of the burning-fluid at the point of combustion, as well as lessening the shade of the light downward.

Having fully described my invention, what I claim as new, and desire to secure by Letters Patent, is—

1. The combination, with a wick tube or receptacle and an independent oil-reservoir, of a vent-tube communicating with the upper portion of the chamber of said wick tube or receptacle, and extending outwardly therefrom a sufficient distance to prevent the gas or vapor issuing therefrom from mingling directly with the flame of the lamp, substantially as set forth.

2. The combination, with a wick tube or receptacle and an independent oil-reservoir, of a vent-tube attached to both the wick-tube and oil-reservoir, and serving to establish a communication between the outer air and the upper portion of the chamber of the wick tube or receptacle, substantially as set forth.

3. The combination, with an oil-reservoir provided with an air-vent communicating with the upper portion thereof, of a wick tube or receptacle provided with a vent-tube extending outwardly therefrom a sufficient distance to prevent the gas or vapor issuing therefrom from mingling with the flame of the lamp, substantially as set forth.

4. The combination, with an oil-reservoir provided with a vent-opening communicating with the upper portion thereof, of an air-vent tube attached to the oil-reservoir, and communicating with the upper portion of the chamber of the wick-tube, substantially as set forth.

5. The combination, with an oil-reservoir provided with a vent-opening in the upper portion thereof, of a wick tube or reservoir and a vent-tube, the latter constructed and arranged to establish a communication between the upper portion of the oil-reservoir and the upper portion of the wick tube or receptacle, substantially as set forth.

6. The combination, with an oil-reservoir and wick tube or receptacle of a lamp, of a tube for conveying oil from the oil-reservoir to the wick-tube, and a vent-tube attached to the oil-reservoir and wick-tube, and serving as a brace between such parts, and also serving to allow of the free escape to the outer air of any vapor or gas generated or formed in the wick-tube, substantially as set forth.

In testimony that I claim the foregoing I have hereunto set my hand this 20th day of January, A. D. 1879.

EDWARD MORTIMER LOWDEN.

Witnesses:

THOMAS F. MALONY,
CHRISTOPHER STANGE.